(12) United States Patent
Lagorgette et al.

(10) Patent No.: US 9,146,539 B2
(45) Date of Patent: Sep. 29, 2015

(54) ELECTRONIC MOVEMENT INCLUDING A MOTOR FOR A TIMEPIECE

(71) Applicant: ETA SA Manufacture Horiogere Suisse, Grenchen (CH)

(72) Inventors: Pascal Lagorgette, Bienne (CH); Raphael Balmer, Courrendlin (CH); Joel Maridor, Neuchatel (CH)

(73) Assignee: ETA SA Manufacture Horlogere Suisse, Grenchen (CH)

( * ) Notice: Subject to any disclaimer, the term of this patent is extended or adjusted under 35 U.S.C. 154(b) by 0 days.

(21) Appl. No.: 14/284,877

(22) Filed: May 22, 2014

(65) Prior Publication Data
US 2014/0362671 A1  Dec. 11, 2014

(30) Foreign Application Priority Data

Jun. 10, 2013  (EP) ..................................... 13171268

(51) Int. Cl.
| | | |
|---|---|---|
| *G04C 3/14* | (2006.01) | |
| *G04C 3/16* | (2006.01) | |
| *H02K 21/14* | (2006.01) | |
| *G04C 3/00* | (2006.01) | |
| *H02K 1/14* | (2006.01) | |

(52) U.S. Cl.
CPC *G04C 3/14* (2013.01); *G04C 3/008* (2013.01); *G04C 3/16* (2013.01); *H02K 1/14* (2013.01); *H02K 21/14* (2013.01)

(58) Field of Classification Search
CPC ............ G04C 3/008; G04C 3/14; G04C 3/16; H02K 21/14; H02K 37/14
USPC ......................... 368/157, 159, 160; 310/49.23
See application file for complete search history.

(56) References Cited

U.S. PATENT DOCUMENTS 4,249,251 A * 2/1981 Wuthrich .......................... 368/76
4,369,385 A * 1/1983 Malkin et al. ............... 310/49.22
(Continued)

FOREIGN PATENT DOCUMENTS

EP     0 847 130 A1   6/1998
EP     0 848 480 A1   6/1998
(Continued)

OTHER PUBLICATIONS

European Search Report issued Mar. 14, 2014, in European Application No. 13171268 filed Jun. 10, 2013 (with English Translation).

*Primary Examiner* — Vit W Miska
(74) *Attorney, Agent, or Firm* — Oblon, McClelland, Maier & Neustadt, L.L.P.

(57) ABSTRACT

The electronic timepiece movement (2) is equipped with a motor (4) including a stator and a permanent magnet rotor (6) situated in a stator hole, said stator defining at least two magnetic poles (12, 14) respectively including at least two pole shoes (16, 18) extending at the periphery of the hole. The motor includes at least one coil (28) respectively mounted around at least one core (26). The two pole shoes and the core form together a first part made of ferromagnetic material formed by or including a single-piece wafer forming both the two pole shoes and the core. An end portion of the core is connected to at least one corresponding pole shoe by a second part, defining a base plate or a main plate made of magnetic material, to which the first part is secured and on which elements of the electronic timepiece movement are at least partially mounted.

6 Claims, 2 Drawing Sheets

(56) References Cited

U.S. PATENT DOCUMENTS

| | | | | |
|---|---|---|---|---|
| 4,376,996 A | * | 3/1983 | Wuthrich | 368/220 |
| 4,382,695 A | * | 5/1983 | Rinaldi et al. | 368/220 |
| 4,392,748 A | * | 7/1983 | Yoshino | 368/88 |
| 4,725,749 A | * | 2/1988 | Wuthrich | 310/49.34 |
| 4,912,832 A | * | 4/1990 | Egger et al. | 29/596 |
| 5,059,840 A | * | 10/1991 | Plancon | 310/49.23 |
| 5,172,349 A | * | 12/1992 | Triponez et al. | 368/157 |
| 6,437,466 B1 | * | 8/2002 | Taghezout | 310/49.23 |

FOREIGN PATENT DOCUMENTS

| | | |
|---|---|---|
| EP | 1 544 693 A1 | 6/2005 |
| FR | 2 532 444 A1 | 3/1984 |

* cited by examiner

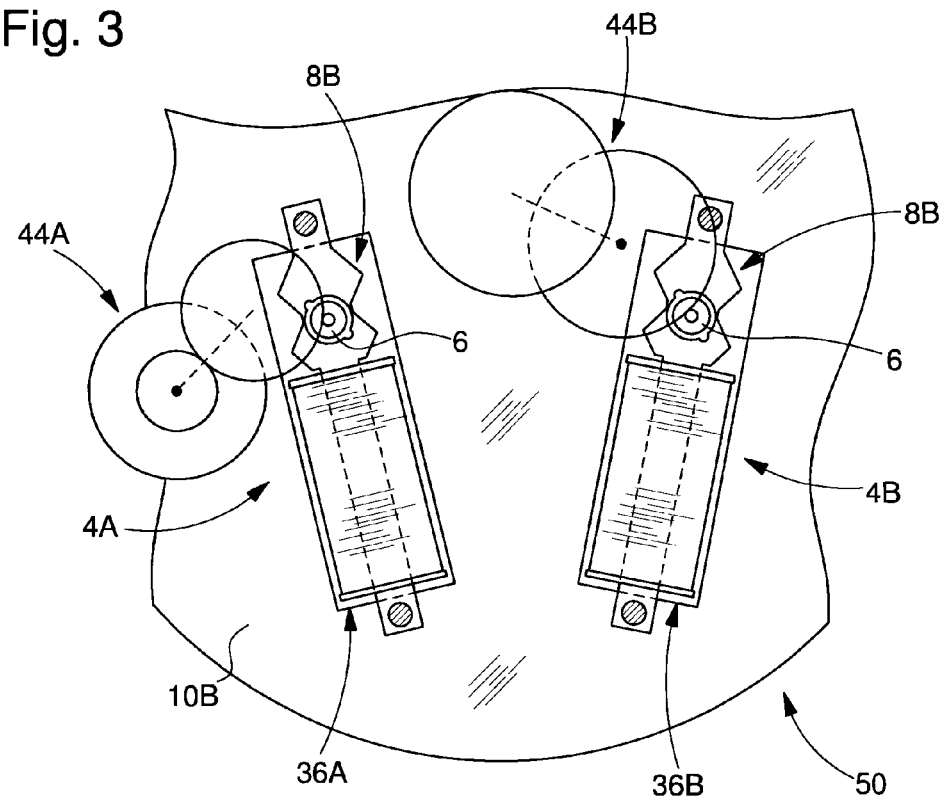
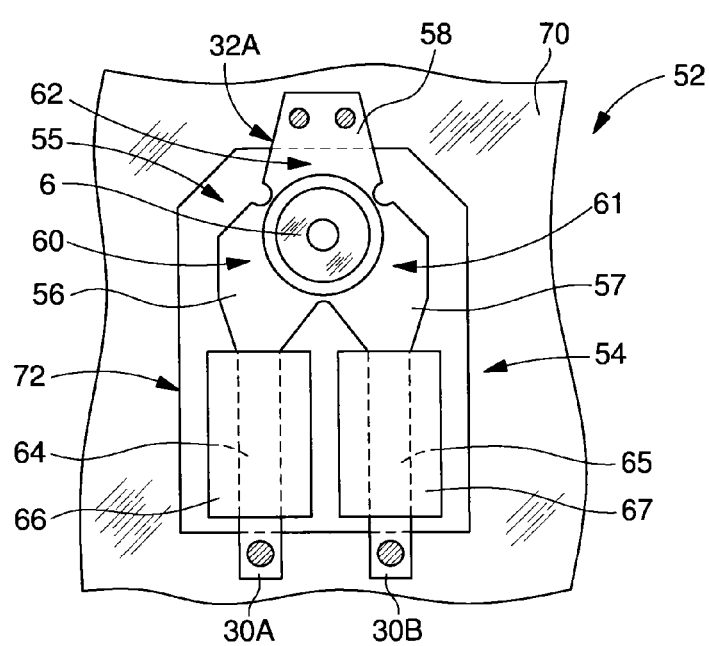

US 9,146,539 B2

ELECTRONIC MOVEMENT INCLUDING A MOTOR FOR A TIMEPIECE

This application claims priority from European Patent Application No. 13171268.9 filed Jun. 10, 2013, the entire disclosure of which is incorporated herein by reference.

FIELD OF THE INVENTION

The present invention concerns the field of electronic timepiece movements which include a motor for a timepiece.

BACKGROUND OF THE INVENTION

There is known, particularly from EP Patent No 0848480, a single-phase motor whose stator is directly formed in a base plate or a main plate made of magnetic material (FIG. 4 in particular), with a hole for the permanent magnet of the rotor being provided in the base plate or main plate. The two poles of the stator are formed by machining an aperture in the base plate or main plate, the machining operation being arranged to form two continuous narrow bridge structures or isthmuses at the periphery of the rotor hole. This arrangement is advantageous for allowing the motor to be positioned anywhere within the base plate or main plate, and for allowing several motors to be arranged in the same base plate or main plate. Further, preferably, elements of the timepiece movement which includes the base plate or main plate are mounted thereon. For example, the bearings of a gear train coupled to the motor are arranged in the base plate or main plate.

However, the aforementioned timepiece movement raises a significant problem. It is difficult to machine the isthmuses separating the two stator poles at the periphery of the rotor hole with the conventional machining techniques used for plates or bridges of a timepiece movement. The isthmuses must be thin to ensure magnetic saturation between the two stator poles. Thus, low tolerance machining must be used to create isthmuses of very small width (in the central part thereof). In a conventional timepiece motor, these isthmuses are obtained by stamping. Stamping isthmuses in a main plate is not without problems and increases the production costs of the plates. Further, the plate has portions, formed by the inner poles located inside apertures, which are fragile and which can easily be bent or broken. A plate generally has to undergo several machining operations and treatments; which involve various manipulations, during which the inner poles risk being damaged. It will be noted that any problem in machining the isthmuses or any inner pole damaged during a manipulation will result in the plate becoming unusable. Plates are expensive. Thus, even for an average industrial yield, the financial loss is high.

SUMMARY OF THE INVENTION

It is an object of the present invention to overcome the drawbacks of the aforementioned prior art.

To this end, the present invention concerns an electronic timepiece movement provided with at least one motor including a stator and a rotor with a permanent magnet arranged in a stator hole, said stator defining at least two magnetic poles respectively including at least two pole shoes extending at the periphery of the hole. The pole shoes are connected to each other by at least one continuous isthmus. The motor further includes at least one coil respectively mounted around at least one core. The pole shoes and the core form together a first part made of ferromagnetic material, said first part being formed by or including a single-piece wafer forming both the pole shoes and the core. An end portion of each coil core is connected to a least one corresponding pole shoe by a second portion, defining a base plate or a main plate made of magnetic material, to which the first part is secured and on which the elements of the electronic timepiece movement are at least partially mounted.

Other particular features of the invention will be set out below in the detailed description of the invention.

BRIEF DESCRIPTION OF THE DRAWINGS

The invention will be described below with reference to the annexed drawings, given by way of non-limiting example, and in which:

FIG. 3 is a schematic plan view of a variant of the first embodiment wherein the timepiece movement includes at least two single-phase motors.

FIG. 4 is a partial, schematic, plan view of a third embodiment of a timepiece movement according to the invention.

DETAILED DESCRIPTION OF THE INVENTION

Figure 2:
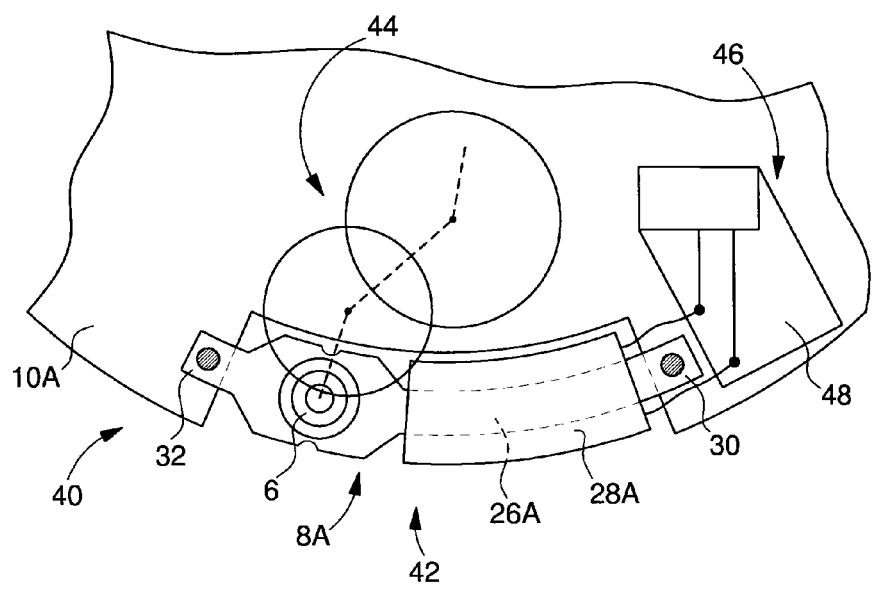
FIG. 2 is a schematic, partial, plan view of a second embodiment of a timepiece movement according to the invention.

FIG. 2 shows part of an electronic timepiece movement 2 equipped with a single-phase motor 4. This single-phase motor includes a stator and a rotor 6. The stator is formed by a first part 8 made of magnetic material and by a base plate or main plate 10 to which the first part is fixedly connected. The stator includes two poles 12 and 14 respectively including two pole shoes 16 and 18, which define a hole 24 for the rotor. These two pole shoes extend at the periphery of a hole 24 and are connected to each other by continuous isthmuses 20 and 22. According to the invention, the first part 8 of the stator includes the two pole shoes and a core 26 made of ferromagnetic material around which a coil 28 is mounted. A first end of core 26 is connected to stator pole 12 while the second end is connected to stator pole 14. More specifically, portion 30 of the second end of the core is fixed to the base plate or main plate 10 by a screw or another securing means whereas the first end is materially extended by stator pole 12, this latter pole being substantially formed by pole shoe 16. The second pole 14 is formed of two distinct parts which are, on the one hand, pole shoe 18 extended by a second end portion 32 of first part 8 and, on the other hand, the base plate or main plate 10. Thus, the end portion 30 of core 26 is magnetically connected to pole shoe 18 of the corresponding stator pole by the base plate or main plate.

"Stator pole" means a portion of the stator, outside the coil core(s), which conveys a magnetic field generated by any one of the coils from one end of the core carrying said coil to a pole shoe which extends over an angular sector at the periphery of the hole for the permanent rotor magnet. A stator pole is thus associated here with a single pole shoe. The magnetic field may be a re-entrant or exiting field relative to said hole depending upon the polarity of the supply current of the coil. It will be noted that within the explanation of the present invention, the coil core(s) are not considered as being distinct element(s) relative to the stator, but as part of the stator.

Figure 1:
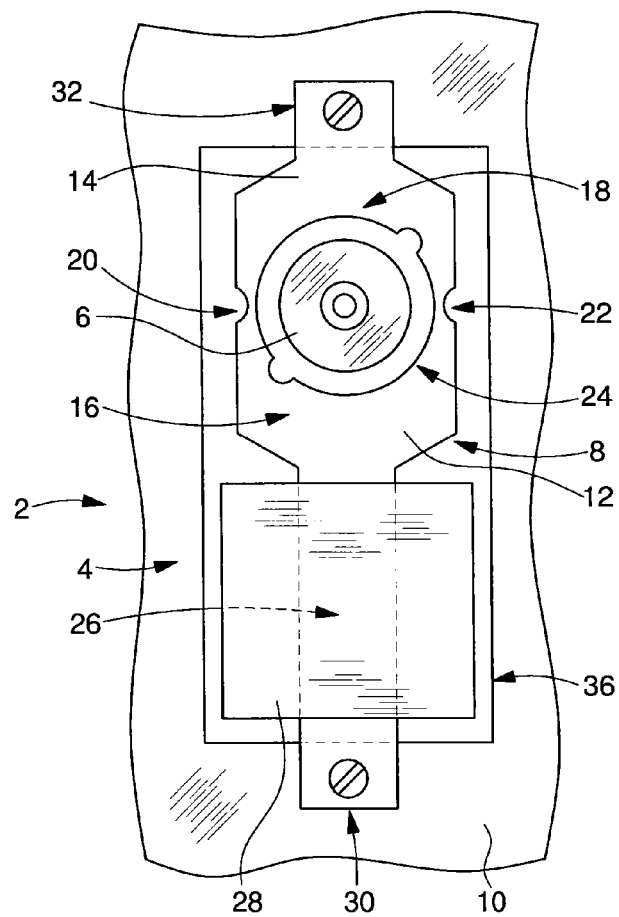
FIG. 1 is a partial, schematic, plan view of a first embodiment of a timepiece movement according to the invention.

In the first embodiment of FIG. 1, the base plate or main plate 10 has an aperture 36 in which coil 28 is partially located and first part 8 of the stator traverses this aperture in projection in a general plane into which the base plate or main plate extends. It will be noted that core 26 and the two pole shoes 16 and 18 of the single-phase motor are substantially aligned and define a plane structure parallel to said general plane, said plane structure extending, in the variant shown in FIG. 1, above aperture 36. The first part is thus superposed on the aperture.

According to the invention, the first part 8 of the stator is formed by or includes a single-piece wafer forming both the two pole shoes and the core. In a variant embodiment, first part 8 is laminated; it then includes a stack of wafers, including at least one single-piece wafer, this latter wafer defining a rotor hole with a closed edge. It will be noted that aperture 36 in base plate or main plate 10 has a simple shape, for example rectangular. None of the areas of the base plate or main plate is made fragile by the incorporation of the motor in the timepiece movement by using the base plate or main plate to partially form a stator pole. Indeed, the isthmuses 20 and 22 are arranged in the first part 8 of the stator, said first part being secured to the base plate or main plate when the timepiece movement is assembled. Thus, the base plate or main plate is manufactured, at least in a preliminary step, separately from first part 8. This first part may be obtained in a conventional manner by stamping; which allows for easy control of the formation of the isthmuses and also of the positioning cells at the periphery of hole 24. The machining of aperture 36 does not cause any problems and can easily be performed during the ordinary manufacture of a timepiece main plate. Further, the two end portions 30 and 32 of first part 8 may be secured to rigid areas of the base plate or main plate.

In the variant shown in FIGS. 1 and 2, the end portion of core 26 has a section with substantially equal dimensions to the section of the longitudinal hole of coil 28 mounted around said core; said coil being preformed, with no coil support, and inserted around the core when the motor is assembled. It will be noted that the dimensions of the core may also be smaller than the section of the coil hole, said coil being, for example, wound around a coil support. It will be noted that, in another variant, the coil may easily be wound directly around the core.

FIG. 2 shows a second embodiment of a timepiece movement 40 according to the invention. It differs from the first embodiment firstly by the fact that core 26A is in an arc of a circle on which there is mounted a coil 28A with a central axis which is also in the arc of a circle. The coil may, as in the first embodiment, be preformed or wound directly onto the core. It differs also in the positioning of the first part 8A of the single-phase motor 42 which is arranged in a notch at the edge of the main plate 10A. The various portions forming first part 8A of the stator will not be described again here in detail. Main plate 10A is made of magnetic material and is used for the return magnetic flux between the two end portions 30 and 32 of first part 8A of motor 42. It will be noted that, in the variant shown, the two end portions 30 and 32 are welded to main plate 10A, particularly by means of a laser beam.

Main plate 10A forms the main plate of electronic timepiece movement 40. Rotor 6 is coupled to a gear train 44 formed of several wheel sets whose arbors rotate in respective bearings arranged in main plate 10A. This main plate also carries various components of electronic circuit 46, which includes a printed circuit board (PCB) 48 with electrical paths and, in particular, two contact pads to which the two ends of coil 28A are electrically connected.

FIG. 3 shows a preferred variant of the first embodiment of the invention. Timepiece movement 50 includes a main plate 10B made of magnetic material with two apertures 36A and 36B above which there are respectively arranged two first parts 8B of two motors 4A and 4B of the timepiece movement. Each of the two first parts 8B is similar to first part 8 of FIG. 1 and will not be described in detail here. The two ends of each first part are welded at the two end portions thereof to main plate 10B. This main plate 10B is common to both motors and is used for mounting various components of the timepiece movement, particularly to two gear trains 44A and 44b which mesh respectively with the two rotors 6 of the two motors 4A and 4B. It will be noted that another variant may have more than two motors according to the invention associated with the same main plate.

FIG. 4 shows schematically a third embodiment of the invention wherein the timepiece movement 52 includes a two-phase motor 54 with three stator poles 56, 57, 58, which define respectively three pole shoes 60, 61, 62. These three pole shoes are connected to each other by continuous isthmuses. As in the first embodiment, the main plate or base plate 70, made of magnetic material, has an aperture 72 above which is arranged the first part 55 of the two-phase motor. This first part includes the three pole shoes, which define the hole for rotor 6, and two cores 64 and 65 which respectively extend the two poles 56 and 57. This first part is made of ferromagnetic material and is formed by or includes at least one single-piece wafer forming both the three pole shoes and the two cores. The two cores respectively carry two coils 66 and 67. The end portion 30A, respectively 30B, of each of the two cores is welded to the main plate or base plate 70. Pole shoe 62 is extended by an end portion 32A, also welded to main plate or base plate 70, which partially forms stator pole 58. Thus, one end portion 30A, respectively 30B of each coil core is connected to a corresponding pole shoe 62 by a second part 70 defining a base plate or a main plate, made of magnetic material, to which the first part 55 is secured.

What is claimed is:

1. An electronic timepiece movement equipped with at least one motor including a stator and a permanent magnet rotor located in a stator hole, said stator defining at least two magnetic poles respectively including at least two pole shoes extending at the periphery of said hole, said at least two pole shoes being connected to each other by at least one continuous isthmus, the motor including at least one coil respectively mounted around at least one core, wherein said at least two pole shoes and said at least one core form together a first part made of ferromagnetic material, said first part being formed by or including at least one single-piece wafer forming both said at least two pole shoes and said at least one core, and wherein an end portion of each coil core is connected to at least one corresponding pole shoe by a second part, defining a base plate or a main plate made of magnetic material, to which said first part is secured and on which elements of said electronic timepiece movement are at least partially mounted.

2. The electronic timepiece movement according to claim 1, wherein said end portion of each core has a section with dimensions that are substantially equal to or smaller than the section of the longitudinal hole of the coil mounted around said core, said coil being preformed with or without a coil support.

3. The timepiece movement according to claim 1, wherein said base plate or main plate has an aperture in which said at least one coil is partially situated, said first part traversing said aperture in projection in the general plane of said base plate or main plate.

4. The electronic timepiece movement according to claim 1, wherein the motor is single-phase with a single coil, and in that said first part defines a plane structure, the coil core and the two pole shoes being substantially aligned.

5. The electronic timepiece movement according to claim 3, wherein the motor is single-phase with a single coil, and wherein said first part defines a plane structure superposed on said aperture, the coil core and the two pole shoes being substantially aligned.

6. The electronic timepiece movement according to claim 3, wherein said base plate or main plate has several apertures in which several structures are respectively arranged, each similar to said first part, said structures respectively forming several motors, said base plate or main plate being common to said several motors.

* * * * *